Feb. 26, 1946.　　　　S. C. HURLEY, JR　　　　2,395,482
PHOTOELECTRIC INSPECTION DEVICE
Filed March 22, 1943　　　　2 Sheets-Sheet 1

Inventor
Samuel C. Hurley, Jr.
By
Attorney

Feb. 26, 1946. S. C. HURLEY, JR 2,395,482
PHOTOELECTRIC INSPECTION DEVICE
Filed March 22, 1943 2 Sheets-Sheet 2

Inventor
Samuel C. Hurley, Jr.
By
Attorney

Patented Feb. 26, 1946

2,395,482

UNITED STATES PATENT OFFICE 2,395,482

PHOTOELECTRIC INSPECTION DEVICE

Samuel C. Hurley, Jr., Danville, Ill.

Application March 22, 1943, Serial No. 480,027

8 Claims. (Cl. 209—111)

This invention relates to an inspection device and more particularly to a device utilizing phototubes for inspecting separate articles or specimens with respect to their light reflecting characteristics.

The invention is illustrated in connection with inspection of sheets of paper or similar material, although it obviously may be adapted to inspection of other types of products. In previous devices of this general character employing gas filled arc discharge tubes for actuating control device for accepting or rejecting specimens, it has been necessary to provide mechanical switching arrangements accurately synchronized with the passage of the articles through the inspection zone in order to prevent improper operation of the device, insure that the device is conditioned for operation when an article enters the test zone, and insure that the gas filled tube is deionized between test cycles.

In accordance with the present invention, a supplemental circuit including phototubes is employed to render the testing device operative only during the time an article is in the testing zone and to provide for deionization of the gas filled arc controlling tube.

It is, therefore, an object of the present invention to provide an improved inspection device in which the presence or entrance of an article to be tested, into the test zone, conditions the test device for the inspection operation and renders the inspection device inoperative upon removal of the article from the test zone.

Another object of the invention is to provide an improved inspection device of the phototube type in which a phototube circuit is employed to render the inspection device operative only when a specimen is present in the testing zone so as to avoid the necessity of employing accurately synchronized mechanical switching devices.

A further object of the invention is to provide an improved inspection device whereby discolorations or other blemishes in sheets of paper or other articles, may be detected and the article accepted or rejected by a device entirely controlled by phototube circuits.

Other objects and advantages of the invention will appear in the following description of prefererd embodiments of the present invention shown in the attached drawings, of which Fig. 1 is a schematic view of an inspection device in accordance with the present invention;

Figure 1:
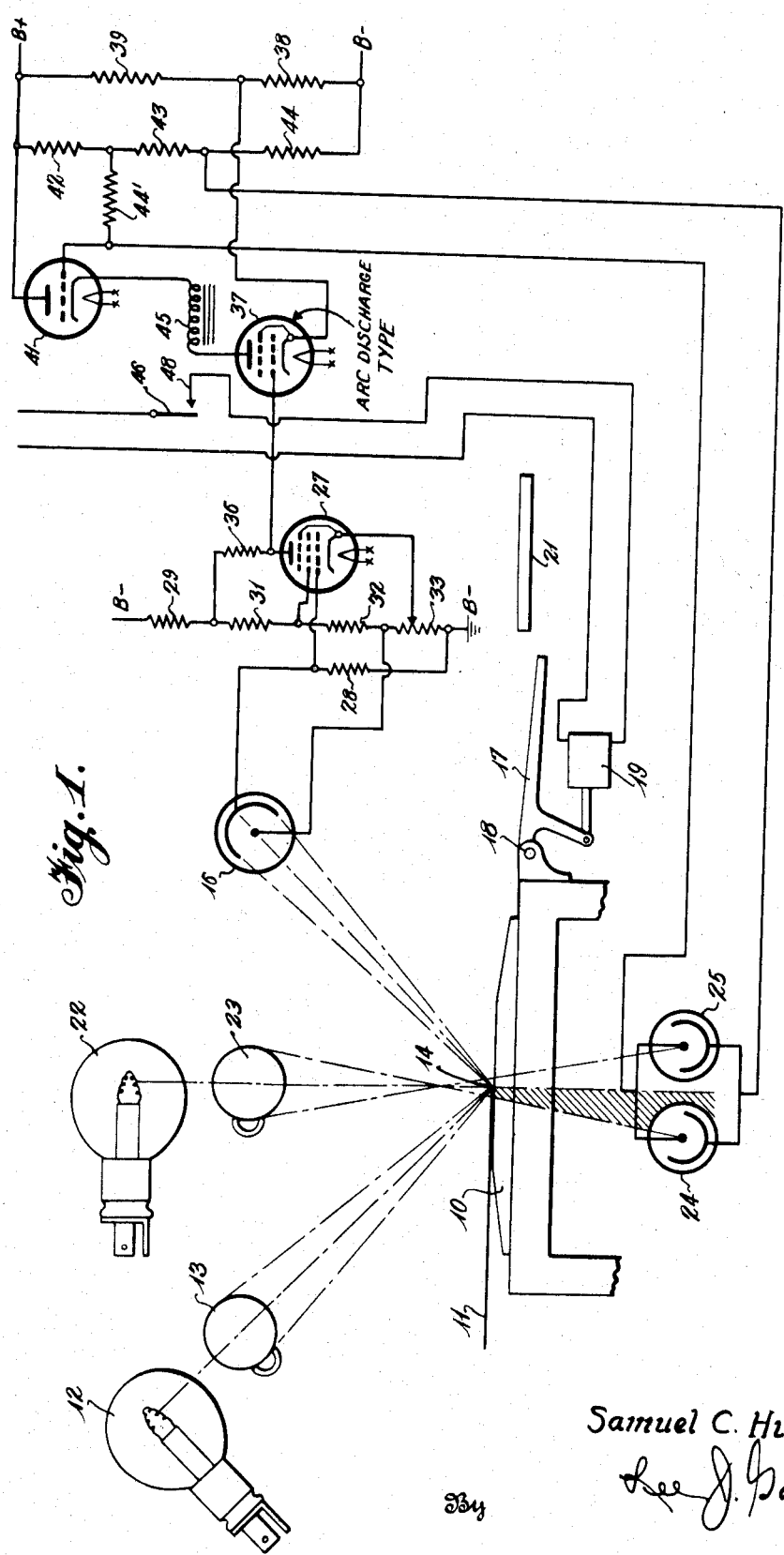

Referring to the drawings, the device of the present invention may include a transparent or apertured support 10 over which an article such as a sheet of paper 11 is passed by any suitable conveying means (not shown). A suitable light source shown as an incandescent lamp 12 and a condensing lens 13 may be employed to direct a sharply focused point or line of light at 14 against the upper surface of the support 10 so that the light is reflected from the article 11 to a phototube 16 when any portion of the article occupies the position 14. The lens 13 is preferably a cylindrical lens so as to produce a line of light across the article 11, but for narrow articles may be a plano-convex or convexo-convex lens for focusing a small spot of light at the inspection position 14. As hereinafter described, the phototube 16 controls the operation of the device to select or reject the article in accordance with the light reflecting characteristics of the article. Such a rejecting or selecting mechanism may be mechanical, electrical, pneumatic, hydraulic, etc., and for purposes of illustration an electrically actuated mechanical selecting device is shown. This selecting device may include a platform 17 pivoted at 18 to the support for the mandrel 10 and normally occupying a position such that the articles conveyed to the right in Fig. 1 across the mandrel 10 are discharged to a "select" receptacle (not shown). A solenoid 19 may be provided for raising the platform 17 so that the article is deposited upon a platform 21 from which it may be conveyed to a "reject" receptacle (not shown), by any suitable conveying means (also not shown).

In order to condition the device so that the inspection circuit is operative only during the presence of the article at the inspection position 14, another source of light which may be an incandescent lamp 22, or any other suitable concentrated source of light, may be provided which, in conjunction with another lens 23 which may be entirely similar to the lens 13, directs a concentrated line or spot of light through the test position 14 so as to impinge the same upon a pair of phototubes 24 and 25 positioned upon the opposite side of the test zone. Preferably, the focus of the lens 23 is slightly above the mandrel 10 so that a substantial area of light is projected onto the test zone. This arrangement makes it possible for the article moving across the test zone to first place the phototube 24 in shadow and then the phototube 25 and as the article leaves the test zone, to first subject phototube 24 to light and then phototube 25. The phototubes 24 and 25 are so connected that only one of them need be in shadow to condition the inspection circuit for the inspection operation. By this arrangement the inspection of the article may be started immediately at the entering edge of the article and the inspection circuit is disabled when no portion of the article is within the test zone.

Figure 2:
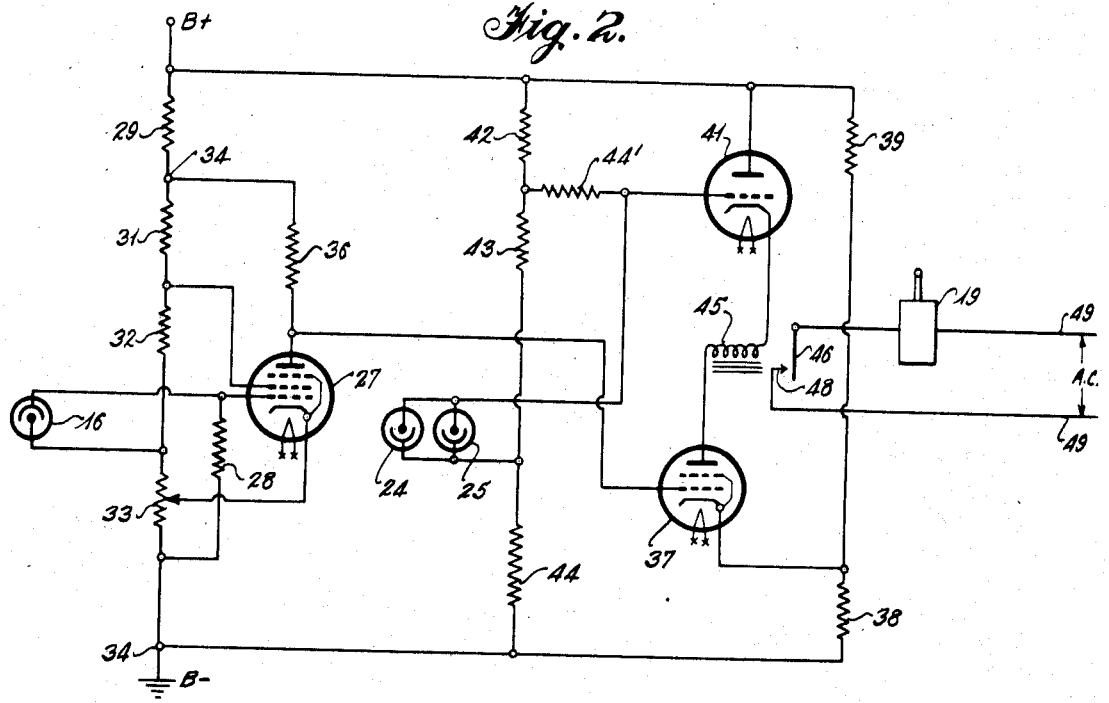
Fig. 2 is a simplified schematic diagram of the circuit of Fig. 1.

The circuit for the inspection phototube 16 is more clearly shown in Fig. 2. In this circuit the cathode of the phototube 16 is connected directly to the control grid of the amplifying tube 27, preferably of the high vacuum pentode type. The control grid of the tube 27 is normally held at a relatively high negative potential with respect to the cathode of the tube 27 by means of a high resistance resistor 28 connected to a point of negative potential with respect to the cathode of the tube 27. The anode of the phototube 16 is connected to a point of positive potential with respect to the cathode of the tube 27 so that the grid of the tube 27 is carried in a positive direction when the tube 16 becomes conducting due to impingement of light thereon.

A plurality of voltage dividing resistors 29, 31, 32 and 33, are connected across a source of direct current voltage in order to supply operating current to the tube 27. Thus the anode of the tube 27 is connected to a point 34 between the resistors 29 and 31 at a relatively high positive voltage through a load resistor 36. The screen grid of the tube 27 is connected to a point between the resistors 31 and 32 at a lower positive potential, the anode of the phototube 16 is connected between the resistors 32 and 33 and the control grid of the tube 27 is connected through the resistor 28 to ground at 34 which is also the negative terminal of the direct current voltage source.

When the phototube 16 is conducting the control grid of the tube 27 is held at a low negative potential so that a relatively large current flows in the anode of the tube 27 and through the load resistor 36. The control grid of a power tube 37 preferably of the gas filled grid controlled arc discharge type is connected to the anode of the tube 27 and the cathode of the tube 37 is held at a positive potential with respect to the potential on the grid of this tube so that tube 37 will not ionize when phototube 16 is rendered conducting by light impinging thereon. The positive potential on the cathode of the tube 37 is obtained by current flow through a resistor 38 connected in series with the resistor 39 across the source of D. C. voltage. When the amount of light reaching the phototube 16 is diminished it becomes non-conducting or has its conductance diminished so that the control grid of the tube 27 is carried in a negative direction by current flow through the resistor 28 to reduce the anode current of tube 27 and thus cause the anode of this tube as well as the control grid of the tube 37 to be carried in a positive direction due to lower voltage drop in the load resistor 38 of the tube 37. The tube 37 is thereby conditioned for ionization but is prevented from becoming conductive by another control tube 41 preferably of the high vacuum type, having its circuit connected in series with the anode circuit of tube 37 unless tube 41 is also rendered sufficiently conducting to support an arc discharge of the tube 37.

The phototubes 24 and 25 for rendering the inspection device operative when an article is in inspection position are normally exposed to light when no article is in the test zone so that the control grid of the tube 41 is normally maintained substantially negative with respect to its cathode. This is accomplished by the voltage dividing resistors 42, 43 and 44 connected across the source of D. C. voltage. The cathodes of the phototubes 24 and 25 are connected to a point of relatively low negative potential with respect to the cathode of the tube 41 by connecting these cathodes between the resistors 43 and 44. The control grid of the tube 41 is connected to the anodes of the phototubes 24 and 25 and through a resistor 44' having a relatively high resistance to a point of relatively high positive potential between the resistors 42 and 43. When the phototubes 24 and 25 are rendered conducting by impingement of light thereon the grid of the tube 41 is maintained negative with respect to its cathode by reason of the voltage drop in resistor 44'. When a phototube 24 or 25 is placed in shadow so that it becomes substantially non-conducting the grid of the tube 41 is carried in a positive direction so that the conductance of tube 41 increases to an extent sufficient to enable tube 37 to ionize if its control grid is positive with respect to its cathode.

When tube 41 is rendered substantially conducting and tube 37 ionizes sufficient current flows in the anode circuits of these tubes to energize a relay coil 45 in series with the anode circuits thereof to attract the armature 46 and establish a circuit through the contact 48. The circuit through the contact 48 may include the solenoid 19 and a source of power current such as that obtained from an alternating current line 49. Establishing of the circuit through the contact 48 energizes the solenoid 19 to reject a specimen being tested. It will be apparent that the light impinging upon the phototubes 16 and at least one of the tubes 24 and 25 must be low in value to cause actuation of the solenoid 19. This is true since the circuit is so arranged that placing only one of the phototubes 24 or 25 in shadow will carry the control grid of the tube 41 in a positive direction sufficiently to enable ionization of the tube 37 or energization of the relay coil 45 to attract its armature.

In operation of the device thus far described, when no article to be inspected is in the test zone, the tubes 24 and 25 are exposed to light from the light source 22 so that the grid of the tube 41 is at a high negative potential with respect to the cathode preventing substantial current flow through the relay coil 45 when no substantial amount of light is reflected to the phototube 16 so that the grid of the tube 37 is positive with respect to its cathode. Movement of an article such as the sheet of paper 11 into the inspection zone first places tube 24 in shadow and then tube 25 in shadow. This results in carrying the grid of the tube 41 in a positive direction to render the tube 41 conductive but by the time tube 24 is placed in shadow, light is being reflected from the article to be tested to the phototube 16. If this light is sufficient to render phototube 16 conducting, the control grid of the tube 37 has been carried sufficiently in a negative direction to prevent ionization thus preventing energization of the relay coil 45 to attract its armature. As the paper moves across the test zone any dark areas therein will reduce the light reflected to phototube 16 to allow tube 37 to ionize and thus operate the relay armature 46 to energize solenoid 19 to cause rejection of the article.

When the tube 37 once ionizes it remains in conducting condition as long as the article stays in the test zone since the tubes 24 and 25 are still in shadow and the tube 41 remains conducting. Upon passage of the article from the test zone the phototube 24 is first exposed to light and then the phototube 25. However, as soon as these tubes are exposed to light the grid of the tube 41 is carried sufficiently negative to deenergize the relay coil 45 and deionize the tube 37 so that the selecting mechanism returns to normal position and the circuit is conditioned for the next inspection operation. Prior to breaking the circuit through the contacts 48, however, the leading edge of the article has been directed toward the rejection position so that it continues into a "reject" receptacle. If no dark areas are encountered in the article, tube 37 is never ionized so that the article is delivered to the "accept" receptacle. It will be noted that the arrangement of phototubes 24 and 25 is such that inspection of the article begins immediately after the leading edge of the article enters the inspection zone and continues until the trailing edge of the article leaves the inspection zone. It will also be apparent that the circuit of Fig. 2 may be employed for detecting dark areas in any type of relatively light colored articles and rejecting the same.

Figure 3:
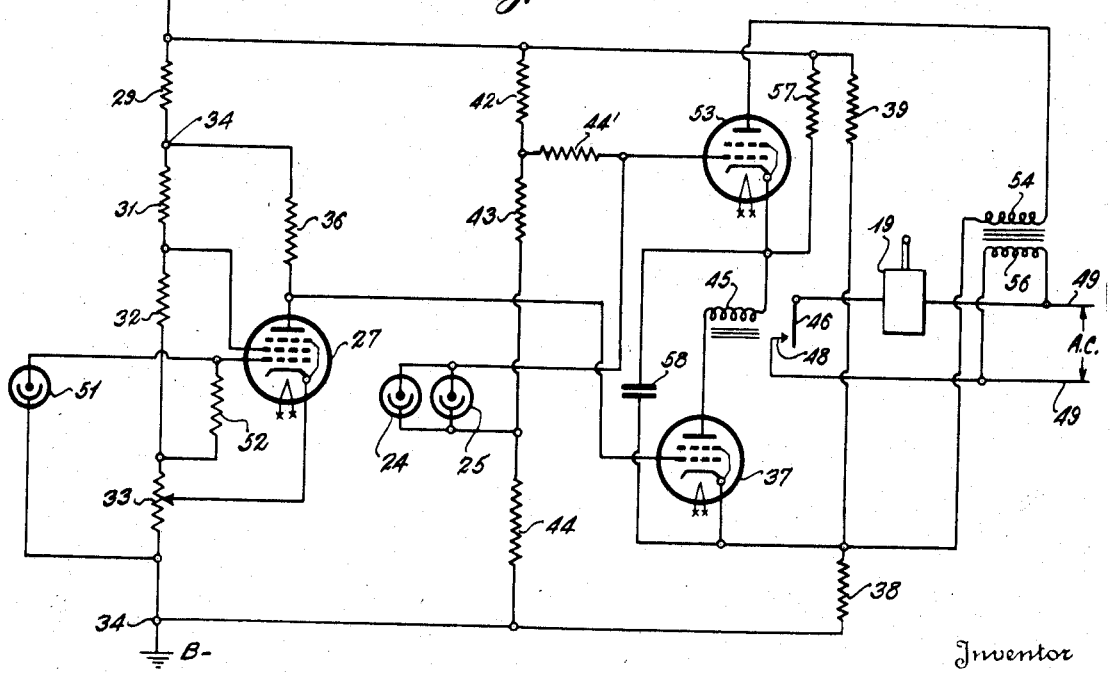
Fig. 3 is a view similar to Fig. 2 showing a modified circuit.

The circuit of Fig. 3, however, is connected to detect light colored areas in relatively dark colored articles. The circuit of Fig. 3 is in general similar to the circuit of Fig. 2 and similar reference characters are employed thereon for similar elements. Thus, the phototubes 24 and 25 and the various voltage dividing resistors therefor may be entirely similar in both figures. However, an inspection phototube 51 is connected so that the grid of tube 27 is maintained positive, or at least at a low negative potential when the phototube 51 is exposed to light. This means that the control grid of the tube 37 is maintained negative with respect to its cathode to prevent ionization of this tube when the phototube 51 is non-conducting. This is accomplished by connecting the cathode of the phototube 51 to a point of negative potential with respect to the cathode of the tube 27 and also connecting the control grid of the tube 27 through a high resistance resistor 52 to a source of positive potential with respect to the cathode of the tube 27.

The phototubes 24 and 25 are connected in exactly the same manner as the phototubes 24 and 25 of Fig. 2. However, the circuit of Fig. 3 is arranged to employ a power control tube 53 of the gas filled grid controlled arc discharge type instead of the high vacuum type tube 41 of Fig. 2. In order to insure deionization of the tube 53 when the grid thereof is carried in a negative direction the anode circuits of the tubes 53 and 37 may be supplied from the alternating current source of power shown as the secondary 54 of a transformer having its primary 56 connected across the alternating current line 49. Since the cathode of the tube 37 is connected between the resistors 38 and 39 in a voltage dividing circuit across the D. C. voltage source, the cathode of the tube 37 is maintained at a definite potential when the tube 37 is not ionized. This enables the control grid thereof to be maintained at a definite negative potential with respect to the cathode of the tube 37 when the phototube 51 is in non-conducting condition so as to prevent ionization of the tube 37. When the tube 37 is not ionized the cathode of the tube 53 may be maintained at a relatively high positive potential with respect to its control grid by means of a high resistance resistor 57, connected to the positive terminal of the direct current voltage source so that this tube is prevented from ionizing unless tube 37 ionizes. Thus, tube 27 must become non-conducting due to impingement of sufficient light upon the phototube 51 before either tube 37 or 53 can ionize even though the control grid of tube 53 has been carried in a positive direction due to a phototube 24 or 25 being non-conducting. When an article is in the test zone and the phototubes 24 and 25 are in shadow, however, the tube 53 is conditioned for ionization, whenever tube 37 ionizes, as the control grid of the tube 53 has been carried in a positive direction.

It will be apparent that when tubes 37 and 53 are deionized a relatively high positive potential builds ups on the anode of tube 37 due to current flow through the resistor 57. A charge is stored in condenser 58 due to the potential drop across the tube 37 and this charge is effective to supply current to establish momentary ionization of the tube 37 even though tube 53 is not yet ionized. Since the control grid of tube 53 has been carried in a positive direction whenever an article is in the test zone, ionization of the tube 37 causes the cathode of the tube 53 to be carried sufficiently negative with respect to the control grid of this tube to allow ionization of tube 53. It will also be apparent that the relay coil 45 in conjunction with the condenser 58 can function as a filter circuit to prevent the voltage across the tube 37 from falling sufficiently low to cause deionization of tube 3 after it has once been ionized and as long as tube 53 remains ionized due to the presence of an article in the test zone.

In operation of the device of Fig. 3 an article entering the test zone places first tube 24 and then tube 25 in shadow. This carries the grid of the tube 53 in a positive direction with respect to its previous potential to condition the tube 53 for ionization. By this time the relatively dark colored article is in the test zone so that the grid of the tube 37 is held negative with respect to its cathode preventing ionization thereof and therefore preventing ionization of tube 53. If a light area is present in the article as it progresses through the test zone, phototube 51 become conducting thus carrying the control grid of the tube 37 in a positive direction enabling ionization of the tubes 37 and 53 since the control grids of both of these tubes have been carried in a positive direction. Since the grid of tube 53 remains positive as long as the article remains in the test zone and the filter circuit, including the condenser 58 and relay coil 45, prevent the voltage across the tube 37 from dropping sufficiently low to cause deionization of the tube at each cycle of the alternating current voltage, the current continues to flow through the anode circuits in the two tubes as long as the article remains in the test zone and the phototubes 24 and 25 remain in shadow. When the phototubes 24 and 25 are again exposed to light by passage of the article from the test zone, the grid of tube 43 is carried in a negative direction. As an alternating current potential is applied across this tube, the control grid regains control and tube 53 deionizes causing deionization of tube 37. Current flow through the anode circuits of tubes 37 and 53 stops and relay coil 45 releases its armature 45. The circuit is then in condition for a subsequent inspection operation.

The device of Fig. 3 is thus similar to the device of Fig. 2 except that the phototube 51 detects light areas in a dark colored article, whereas the phototube 16 of Fig. 2 detects dark colored areas in a light colored article and a gas filled grid controlled arc discharge tube 53 is employed in the circuit of Fig. 3 instead of the high vacuum tube 43 employed in Fig. 2. It is apparent that the connection of the tube 16 of Fig. 2 may be employed in the circuit of Fig. 3 to adapt this circuit for discarding light colored articles having dark colored areas therein or conversely that the connection of the tube 51 of Fig. 3 can be employed in the circuit of Fig. 2.

It will be apparent that the inspection devices of the present invention entirely eliminate the necessity of accurately synchronized mechanically actuated switches for conditioning the inspection devices for inspection of an article entering the test zone and for controlling the ionization and deionization of gas filled power controlling tubes. Also the inspection of an article moved through the test zone, extends throughout the length of the article beginning immediately adjacent the leading edge and ending immediately adjacent the trailing edge.

While I have disclosed the preferred embodiments of my invention it is to be understood that the details thereof may be varied within the scope of the following claims:

I claim as my invention:

1. In a photoelectric inspection device, a source of light and an optical system providing a beam of light and directing said beam to a test zone, selecting means for accepting or rejecting an article passed through said test zone, said selecting means including a first control tube having a cathode, a control electrode, an anode circuit, a relay having an operating coil in said anode circuit and a selecting device controlled by said relay, a phototube circuit including a phototube responsive to light reflected from said article for varying the potential of said control electrode with respect to said cathode to cause said selecting device to accept or reject said article in accordance with the light reflecting characteristics of said article, a second phototube circuit including a second phototube responsive to light passing through said test zone, means including a second control tube under control of said second phototube circuit and having its anode circuit in series with the anode circuit of said first control tube for disabling said selecting means when no article is in said test zone and for conditioning said selecting means for operation when said article intercepts said light passing through said test zone.

2. In a photoelectric inspection device, a source of light and an optical system providing a beam of light and directing said beam to a test zone, selecting means for accepting or rejecting an article passed through said test zone, said selecting means including a first control tube having a cathode, a control electrode, an anode circuit a relay having an operating coil in said anode circuit and a selecting device controlled by said relay, a phototube circuit including a phototube responsive to light reflected from said article for varying the potential of said control electrode with respect to said cathode to cause said selecting device to accept or reject said article in accordance with the light reflecting characteristics of said article, a second phototube circuit including a second phototube responsive to light passing through said test zone, means including a second control tube under control of said second phototube circuit and having its anode circuit in series with the anode circuit of said first control tube for disabling said selecting means when no article is in said test zone and for conditioning said selecting means for operation when said article intercepts said light passing through said test zone, said first control tube being of the grid controlled arc discharged type and said second control tube being of the high vacuum type so as to enable deionization of said first tube when said selecting means is disabled by said last named means.

3. In a photoelectric inspection device, a source of light and an optical system providing a beam of light and directing said beam to a test zone, selecting means for accepting or rejecting an article moved through said test zone, which article has a dimension in the direction of movement thereof which is large relative to said test zone, a phototube circuit including a phototube responsive to light reflected from said article for controlling said selecting means to accept or reject said article in accordance with the light reflecting characteristics of said article, a control means having a second phototube circuit including a phototube responsive to light passing through said test zone for conditioning said selecting means for operation during substantially the entire time said article intercepts the light passing through said test zone and responsive to light passing through said test zone when said article is removed from said zone for disabling said selecting means, said selecting means including a selecting device having an accept position and a reject position for rejecting said article if the light reflecting characteristics of any portion of said article departs from a predetermined standard, and means for maintaining said selecting device in reject position until said selecting device is disabled by said control device.

4. In a photoelectric inspection device, a source of light and an optical system providing a beam of light and directing said beam to a test zone, selecting means for accepting or rejecting an article passed through said test zone, a phototube circuit including a phototube responsive to light reflected from said article for controlling said selecting means to accept or reject said article in accordance with the light reflecting characteristics of said article, a control device having a second phototube circuit including a phototube responsive to interruption of light passing through said test zone by entrance of an article to be tested into said zone for conditioning said selecting means for operation and responsive to light passing through said test zone when said article is removed from said zone for disabling said selecting means, said selecting means including a selecting device having an accept position and a reject position for rejecting said article if the light reflecting characteristics of any portion of said article departs from a predetermined standard, and means for maintaining said selecting device in reject position until said selecting device is disabled by said control device, said last named means comprising a control tube of the grid controlled arc discharge type which is ionized to cause said selecting device to move to reject position, an anode circuit for said control tube, and a source of direct current voltage for energizing said anode circuit, said control device operating to disable said direct current source for deionizing said control tube when said article is removed from said test zone.

5. The combination set forth in claim 4 in which said direct current source comprises another tube of the grid controlled arc discharge type having its grid potential controlled by said second phototube circuit, an anode circuit for said other tube in series with the anode circuit of said control tube, a source of alternating current for said anode circuits and a filter circuit for supplying direct current voltage to the anode circuit of said control tube.

6. The combination set forth in claim 4, in which said direct current source comprises another tube of the grid controlled arc discharge type having its grid potential controlled by said second phototube circuit, an anode circuit for said other tube in series with the anode circuit of said control tube, a source of alternating current for said anode circuits, a filter circuit for supplying direct current voltage to the anode circuit of said control tube, and means for maintaining the cathode of said other tube at a positive potential with respect to its grid when said control tube and other tube are deionized.

7. In a photoelectric inspection device for testing articles, a first control tube controlled by a light sensitive circuit responsive to a source of light for testing the article, an energy translation means such as a relay coil in the anode circuit of said first control tube, a second light sensitive circuit responsive to light for indicating the proper position of the article in the test zone, means including a second control tube under control of the second light sensitive circuit and having its anode circuit in series with the anode circuit of said first control tube for preventing actuation of the energy translation means when no article is in the testing zone and for permitting actuation of the energy translation means when the article is properly in the testing zone.

8. In a photoelectric inspection device for testing articles, means for directing a beam of light to a test zone, a first light sensitive circuit responsive to a source of light for testing the article, a first control tube having a cathode circuit, a control electrode and an anode circuit, said control electrode responsive to said source of light, an energy translation means such as a relay coil in the anode circuit of said first control tube, a second light sensitive circuit responsive to light for indicating the proper position of the article in the test zone, a second control tube having an anode circuit, a cathode circuit and a control electrode and having its anode circuit in series with the anode circuit of the first control tube, said control electrode in the second control tube under control of the second light sensitive circuit for preventing actuation of the energy translation means when no article is in the test zone and for permitting actuation of the energy translation means when the article is properly in the test zone.

SAMUEL C. HURLEY, Jr.